United States Patent
Milford

(10) Patent No.: US 7,155,514 B1
(45) Date of Patent: Dec. 26, 2006

(54) APPARATUS FOR EVENT LOG MANAGEMENT

(75) Inventor: Robert Andrew Milford, Marietta, GA (US)

(73) Assignee: Dorian Software Creations, Inc., Atlanta, GA (US)

( * ) Notice: Subject to any disclaimer, the term of this patent is extended or adjusted under 35 U.S.C. 154(b) by 860 days.

(21) Appl. No.: 10/389,062

(22) Filed: Mar. 14, 2003

Related U.S. Application Data

(60) Provisional application No. 60/450,399, filed on Feb. 27, 2003, provisional application No. 60/410,060, filed on Sep. 12, 2002.

(51) Int. Cl.
H06F 15/16 (2006.01)
H06F 12/08 (2006.01)

(52) U.S. Cl. ............... 709/225; 709/224; 709/228; 709/245; 370/236; 370/350; 345/736

(58) Field of Classification Search ............ 709/217, 709/224, 227, 245, 225; 370/236, 241; 379/32, 379/33; 345/736
See application file for complete search history.

(56) References Cited

U.S. PATENT DOCUMENTS

| | | | |
|---|---|---|---|
| 5,049,873 A * | 9/1991 | Robins et al. ......... | 340/825.01 |
| 5,655,081 A * | 8/1997 | Bonnell et al. ......... | 709/202 |
| 5,696,486 A | 12/1997 | Poliquin | |
| 5,944,782 A | 8/1999 | Noble | |
| 6,128,016 A * | 10/2000 | Coelho et al. ......... | 715/808 |
| 6,170,005 B1 * | 1/2001 | Meandzija ............ | 709/217 |
| 6,173,418 B1 | 1/2001 | Fujino | |
| 6,192,365 B1 | 2/2001 | Draper | |
| 6,289,379 B1 | 9/2001 | Urano | |
| 6,356,282 B1 * | 3/2002 | Roytman et al. ....... | 715/736 |

* cited by examiner

*Primary Examiner*—Khanh Quang Dinh
(74) *Attorney, Agent, or Firm*—Patent Focus, Inc.; Richard C. McComas

(57) ABSTRACT

An agent-free modular Event Log Management System for commanding and controlling system event logs. The Event Log Management System's modules function independently or in concert with other system modules. The system comprises four separate and distinct agent-free modules that command and control event archiving, event alarm and event analysis of data residing on server computers and/or databases within a given computer network and system configuration management. Any given module may, if desired, operationally function independent of the other three modules or the four modules may be combined and in concert form the agent-free modular Event Log Management System. When deployed as a system the modules reside on at least one data storage medium of the computer network wherein at least one computer of the network is generating event logs.

34 Claims, 11 Drawing Sheets

APPARATUS FOR EVENT LOG MANAGEMENT

CROSS-REFERENCE TO RELATED APPLICATION

This application claims the benefit of U.S. Provisional Application No. 60/410,060 filed on Sep. 12, 2002 and U.S. Provisional Application No. 60/450,399 filed on Feb. 27, 2003 both of which are included herein.

FIELD OF THE INVENTION

The invention relates, in general, to a system for event log management. In particular the invention relates to a plurality of data structures stored in the memory wherein the data structures are formulated into instruction modules to direct the functioning of an event log management system.

BACKGROUND

The data processing resources of business organizations are increasingly taking the form of a distributed computing environment in which data and processing are dispersed over a network comprising many interconnected, heterogeneous and geographically remote computers. Among the reasons for this approach are to offload non-mission-critical processing from the mainframe, to provide a pragmatic alternative to centralized corporate databases, to establish a single computing environment, to move control into the operating divisions of the company, and to avoid having a single point of failure. For example, many business entities have one client/server network installed in each regional office, in which a high-capacity computer system operates as the "server" supporting many lower-capacity "client" desktop computers. The servers in such a business entity are also commonly connected to one another by a higher-level network known as a wide area network. In this manner, users at any location within the business entity can theoretically access resources available in the company's network regardless of where the resource is located.

The flexibility gained for users with this type of arrangement comes with a price, however. It is very difficult to manage such a diverse and widely dispersed network for many reasons. Servers installed in the wide area network are frequently not all of the same variety. One regional office may be using an IBM computer with a UNIX operating system, while another regional office may be using a DEC computer with a VMS operating system. In addition, applications present on the servers throughout the network vary in terms of not only type, but also product release level within an application type. Moreover, the applications available are changed frequently by users throughout the network, and failure events in such a network are usually difficult to catch until after a failure has already occurred.

When an error occurs, the System Administrator or support technicians must determine what caused the error, attempt to recover any lost data, and prevent the error from recurring. It is helpful if applications, operating systems, system service records and important events such as low-memory conditions or excessive attempts to access a disk are known. The System Administrator can use event logs to help determine what conditions caused the error and the context in which it occurred. By periodically viewing the event logs, the System Administrator may be able to identify problems before they cause damage to the computer network.

Although event logs enable the System Administrator to possibly understand the nature of computer network failures, the management of the event logs poses a monumental problem. Event logs grow in size very rapidly and consume large areas of disk space. A large volume of event logs may contain the source of a network failure but sorting though voluminous event logs is a daunting and time consuming task. For example, a computer network supporting the Windows NT platform was introduced by Microsoft® several years ago. System Administrators have struggled with the task of maintaining their event logs ever since.

In some cases, System Administrators choose to have Windows NT computers overwrite old event log entries when the logs become full in a circular action. In most security conscious organizations, however, this is frowned upon since vital information is lost and unrecoverable. Alternatively, System Administrators set up their Windows NT/2000® computers so that no information is overwritten. Unfortunately, this makes the System Administrators clear each log by hand using the Event Viewer application which is a part of the Windows NT/2000® platform.

Even if an System Administrator writes a script to insure the timely backup and clearing of his/her server's event logs, finding a way to centralize the data collected from the computers is another problem. Most organizations require that event log data be stored in different formats, such as native Event Viewer files (.EVT format), comma-delimited text files or actual ODBC Databases like Microsoft Access® and Microsoft® SQL Server. In some cases, organizations may want duplicate sets of the data in different formats, such as EVT files for law enforcement usage, or database tables so that advanced analysis can be performed on the event logs. Gathering the data manually in multiple formats for long-term storage simply requires too many employee hours to implement. More often, event logs are misplaced or neglected, and critical security data is not readily available in the event of a network attack.

Finally, there is no native way in either Microsoft Windows NT® itself or via its resource kit utilities to push-out a unified auditing strategy to all of the servers and workstations which comprise a Windows NT/2000® domain. Although domain-controlling servers replicate their audit policies among one another, stand alone servers and workstations have no mechanism for sharing a centrally defined audit policy. Consequently, if a single server or workstation is compromised on a network, it may not be set up to report the unauthorized access in its security log. Likewise, there is no native way to centralize either event log file size or retention policies. As a result, some computers may inadvertently write over important events when their fixed event log size is exceeded.

One attempt to manage event logs in a computer network focuses on having a manager system deployed on one of the network computers. The other computers in the network have an agent system deployed thereon. Each respective agent system carries out tasks on the computer system in which it is deployed such as event logging. The manager software system commands and controls the operation of all of the agents deployed throughout the computer network. The principle disadvantage to this approach is the inflexibility of the agent system. The manger/agent system of managing event logs has to be deployed on every computer in the network. The manger/agent system does not resolve the voluminous event log storage problems existing on local or sub-network computers of the network. It only adds another layer of control.

It would be desirable to have an agent-free modular system to manage event logs on a computer network. The agent-free modular system would have the flexibility to be deployed as individual modules or a complete system. The agent-free modular system would monitor, archive and analyze event logs in real time in a plurality of different formats to accommodate the various system formats of the computer network. Further, it would be desirable to have means of updating individual modules throughout the computer network from a central location.

SUMMARY

The present invention is an agent-free modular Event Log Management System. The Event Log Management System's modules may, if desired, function independently or in concert with other system modules. The present invention may, if desired, be deployed in total i.e., all of the Event Log Management System's modules are deployed on the same computer network. The present invention may, if desired, be modularly deployed on a computer network i.e., one or more of the Event Log Management System's modules are deployed on the same computer network.

Deployment of the present invention may, if desired, be in a wide variety of computer network configurations or topologies. Generally, computer network topologies may be classified as Demilitarized Zone, Wide Area Network and Local Area Network deployments.

The present invention comprises four separate and distinct agent-free modules that command and control event archiving, event alarm and event analysis of data residing on server computers and/or databases within a given computer network and configuration management. The four modules are Event Alarm Module, Event Archiver Module, Event Analyst Module and the Site Manager Module. Any given module may, if desired, operationally function independent of the other three modules or the four modules may be combined and in concert form the agent-free modular Event Log Management System.

The present invention deployed as a system i.e., the agent-free Event Alarm Module, Event Archiver Module Event Analyst Module and the Site Manager Module are deployed in concert, resides on at least one data storage medium of the computer network wherein at least one computer of the network is generating event logs. The Event Alarm Module loads an Event Log Reader Control onto its memory space. The Event Alarm Module "watches over" selected event logs of selected computers of the network per the System Administrator's predefined configuration. When an event occurs meeting the predefined criteria, the Event Alarm Module forwards that event log record to selected recipients, the System Administrator or stores the record in one of a plurality of selected formats. Once all appropriate event logs have been scanned, the Event Log Reader Control is unloaded from memory. This "watching over", scanning and event log retrieving process continues indefinitely for all of the computers across the network domain.

The Event Archiver Module functions as a service provider to automatically back up and clear selected event log(s) from selected computer(s) of the network per the System Administrator's predefined configuration. In operation: The Event Archiver Module first commands the Operating System to save its event log file to a secondary location. Then, the Event Archiver Module loads an Event Log Reader Control onto its memory space. The Event Log Reader Control retrieves selected event log records from the saved event log file on its host computer or other selected computers of the network. The Event Archiver Module may, if desired, store the retrieved event log records in a database or a centralized database. The centralized database may, if desired, be the same database in which the Event Alarm Module stores its retrieved event log records. Once all appropriate event logs have been scanned, backed-up and/or cleared the Event Log Reader Control is unloaded from memory. This process continues indefinitely for all of the computers across the network domain.

The Event Analyst Module analyzes, views and reports on a plurality of event logs. The Event Analyst Module may, if desired, function in a plurality of different formats to enable the System Administrator to analyze event logs across a variety of different computer platforms present on the computer network. The Event Analyst Module may, if desired, analyze, view and report event logs from individual computers of the network by loading an Event Log Reader Control onto its memory space. The Event Analyst Module retrieves at least one selected event log record for analysis per the System Administrator's predefined configuration. The Event Analyst Module selectively generates at least one window containing the selected event log records in a selected format. After the analysis is complete, the Event Analyst Module unloads the Event Log Reader Control from memory. The Event Analyst Module may, if desired, open a window for analysis containing selected event log records generated by the Event Archiver Module and/or the Event Alarm Module.

The System Administrator may, if desired, implement a Site Manager Module on a central computer in communication with the computer network. The Site Manager Module controls the updating of the Event Analyst Module, Event Alarm Module and the Event Archiver Module. The System Administrator may, if desired, add selected computers or other networks to the control structure of the Site Manager Module. The Event Analyst Module, Event Alarm Module and the Event Archiver Module may, if desired, be installed separately on individual computers or unloaded from selected computers and reloaded to any computer in the network. The Site Manager Module scans the computer network to determine the location of each Event Analyst Module, Event Alarm Module and Event Archiver Module distributed throughout the computer network. Further, once the scan is complete the Site Manager Module constructs a network schema that is viewable by the System Administrator via the user interface. After the locations of the Event Analyst Module, Event Alarm Module and the Event Archiver Module are identified, the Site Manager Module may, if desired, push new or updated configuration datasets to selected sites.

When the agent-free Event Alarm Module, Event Archiver Module, Event Analyst Module and the Site Manager Module are deployed as a system, all four modules may, if desired, reside in the same memory space on the same computer or database or the four modules may reside in the memory space of a plurality of computers and/or databases of the network. The functionality of each module whether in a system configuration or deployed individually remains the same.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which.

DETAILED DESCRIPTION

Figure 1A:
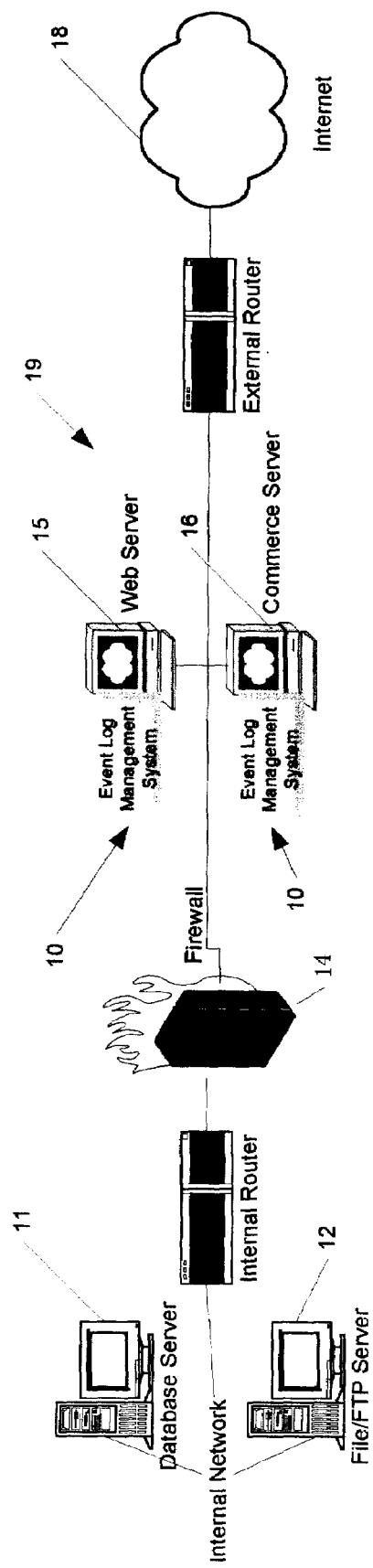
FIG. 1a illustrates a top-level block diagram view of a Demilitarized Zone deployment of the present invention.

Before describing in detail the particular improved modular system architecture for event log management in accordance with the present invention, it should be observed that the invention resides primarily in the novel data structures of the system software and not in the combination of conventional system apparatus. Examples of a system apparatus are a computer, database, telephone network, PBX system or a communication system linking the system apparatus by a local area network, wide area network, or Internet network. The present invention utilizes discrete subsystems or sub-assembly components, and associated control of the aforementioned system apparatus and components. The invention is not in the particular detailed configuration of the system apparatus but in the command and control thereof. Accordingly, the data structures, command, control and arrangement of the present invention have, for the most part, been illustrated in the drawings by readily understandable block diagrams. The drawings show only those specific details that are pertinent to the present invention in order not to obscure the disclosure with structural details which will be readily apparent to those skilled in the art having the benefit of the description herein.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An overview of the present invention: The present invention 10, FIG. 1a is an agent-free modular Event Log Management System. The Event Log Management System's modules (discussed herein) may, if desired, function independently or in concert with other system modules. The present invention 10 may, if desired, be deployed in total i.e., all of the Event Log Management System's modules are deployed on the same computer network. The present invention 10 may, if desired, be modularly deployed on a computer network i.e., one or more of the Event Log Management System's modules are deployed on the same computer network.

Deployment of the present invention 10 may, if desired, be in a wide variety of computer network configurations or topologies. Generally, computer network topologies may be classified as Demilitarized Zone (DMZ) 19, FIG. 1a, Wide Area Network (WAN) 20, FIG. 1b and Local Area Network (LAN) 21, FIG. 1c deployments. It should be noted that with many companies, organizations or individuals all of these topologies may exist, often as hybrids to two or more of these core topologies.

The DMZ deployment 19, FIG. 1a topology is common in organizations that have both public (computers 15 and 16 directly accessible via the Internet 18) and private (computers 11 and 12 behind firewalls 14, not directly connected to the Internet 18) networks. The present invention 10 is deployed directly on each computer located in the DMZ 19. Computers 15 and 16 may, if desired, be the only computers deployed in the DMZ 19 or there may be a plurality of computers deployed. Just as each computer 15 and 16 is responsible for its distinct role in the DMZ 19 deployment, each computer 15 and 16 are also responsible for running all or part of the present invention 10 autonomously on itself.

Figure 1B:
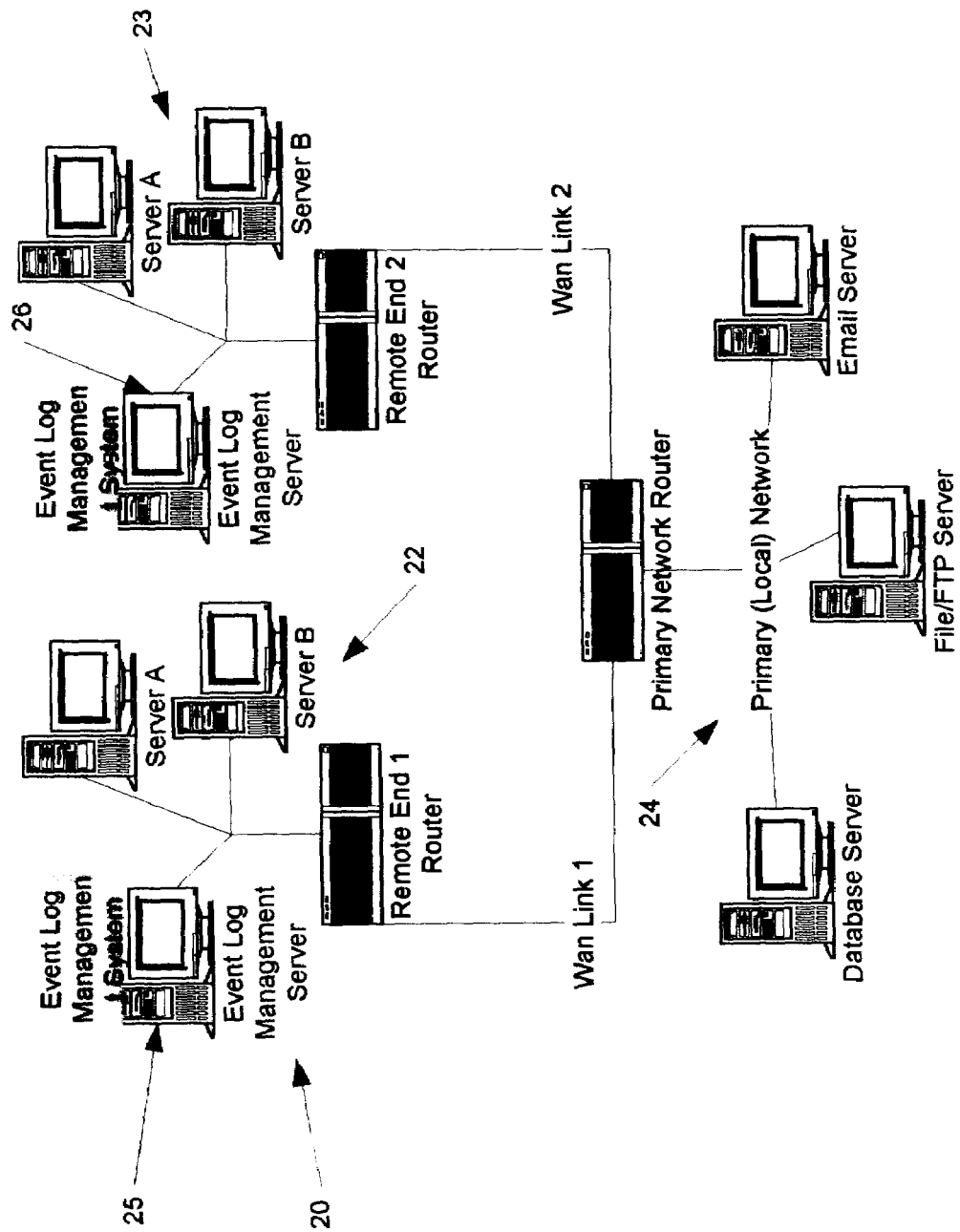
FIG. 1b illustrates a top-level block diagram view of a Wide Area Network deployment of the present invention.

Generally, larger organizations implement a WAN 20, FIG. 1b to connect one or more remote networks 22 and/or 23 (e.g. satellite offices) to the primary network 24 (e.g. main office). In this particular deployment the present invention 10 may, if desired, be placed on at least one server at each of the remote ends of the WAN 20 i.e., Servers 25 and 26. While the DMZ 19 deployment required the present invention 10 to be placed on each Server acting autonomously from one another, wide area network deployments may have one or a group of Servers managing event logs and/or Syslogs on other Servers within the same remote end. The present invention 10 may also be deployed on each system located in a given remote end of the network. For example, the present invention 10, FIG. 1b deployed on sever 25 of remote network 22 manages all of the event logs located on computers and devices within the given remote end. Further, the present invention 10, FIG. 1b deployed on sever 26 of remote network 23 manages all of the event logs located on computers and devices within the given remote end. Event logs can be monitored, collected and analyzed over the network without the present invention 10 being installed on each computer or device.

A System Administrator of the WAN 20, FIG. 1b may, if desired, configure the present invention 10 to forward selected types of information i.e., specific event log records, event log files, email notifications, Syslog notifications, etc over Wide Area Network links to the primary network. In doing so, System Administrators can consolidate select sets of log information and notifications from different remote end networks 22 or 23 within the primary network 24.

Figure 1C:
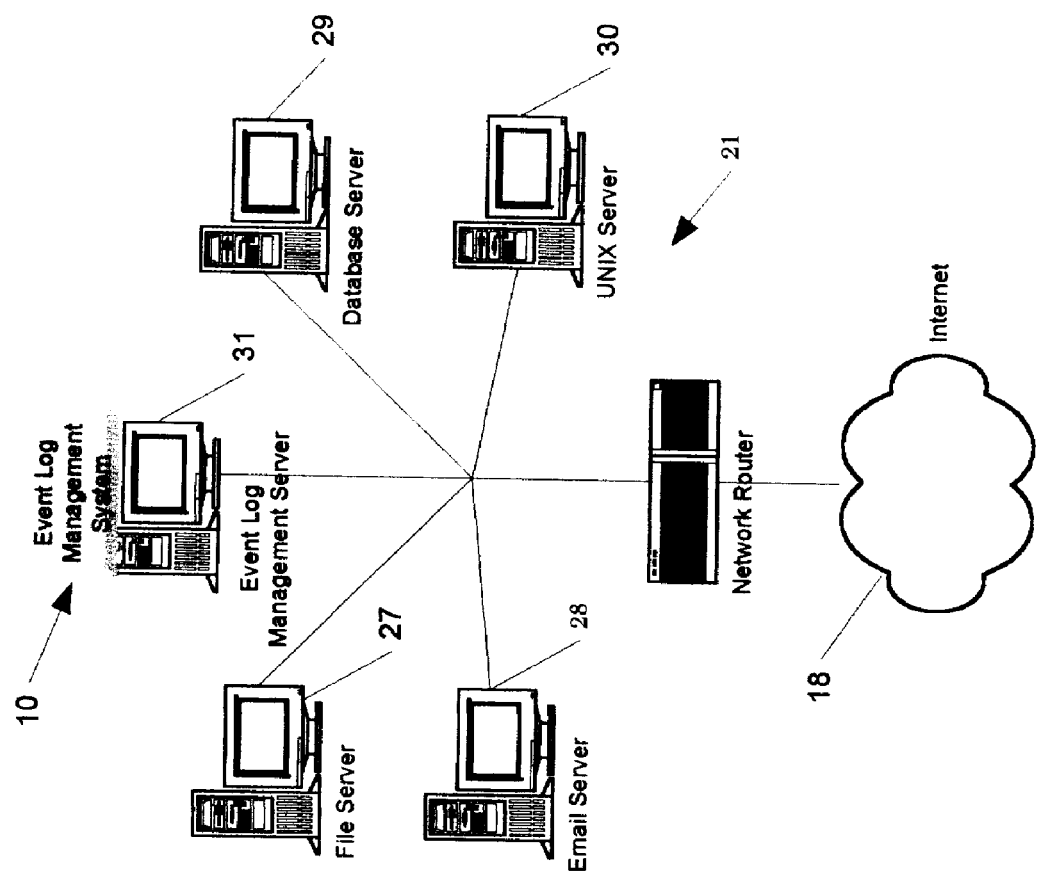
FIG. 1c illustrates a top-level block diagram view of a Local Area Network deployment of the present invention.

Typically, small and large organizations have at least one Local Area Network (LAN) 21, FIG. 1c configuration to interconnect critical Servers and workstations. The network infrastructure of the LAN 21 supports high-speed data transfer (such as 100 Megabits per second or higher), so there is often ample bandwidth to allow the present invention 10 to collect, monitor, and analyze event logs over the network without having the present invention 10 deployed on every computer system in the LAN 21.

The present invention 10, FIG. 1c may, if desired, be deployed on every computer within the LAN 21 at the System Administrator's discretion but generally, the present invention 10 is deployed on one or a small subset of computer systems managing the event logs of all others. For example, the present invention 10 is deployed on an Event Log Management Server 31 and manages the event logs on systems throughout the LAN 21 comprising a File Server 27, Database Server 29, Email Server 28 and Unix Server 30. The event log records may be stored on a Database Server 29 or log files themselves may be stored on a File Server 27. The notifications produced by the present invention 10 in response to the detection of certain events can be sent to the System Administrators within the LAN 21 (e.g. network popups, email messages, Syslog messages, broadcast messages, database insertions) or outside the LAN 21 (e.g. email messages via the Email Server 28, Syslog messages, numeric pages, or database insertions). Finally, event log data stored on the Database Server 29 or File Server 27 can be analyzed and reported on by the present invention 10.

Figure 2:
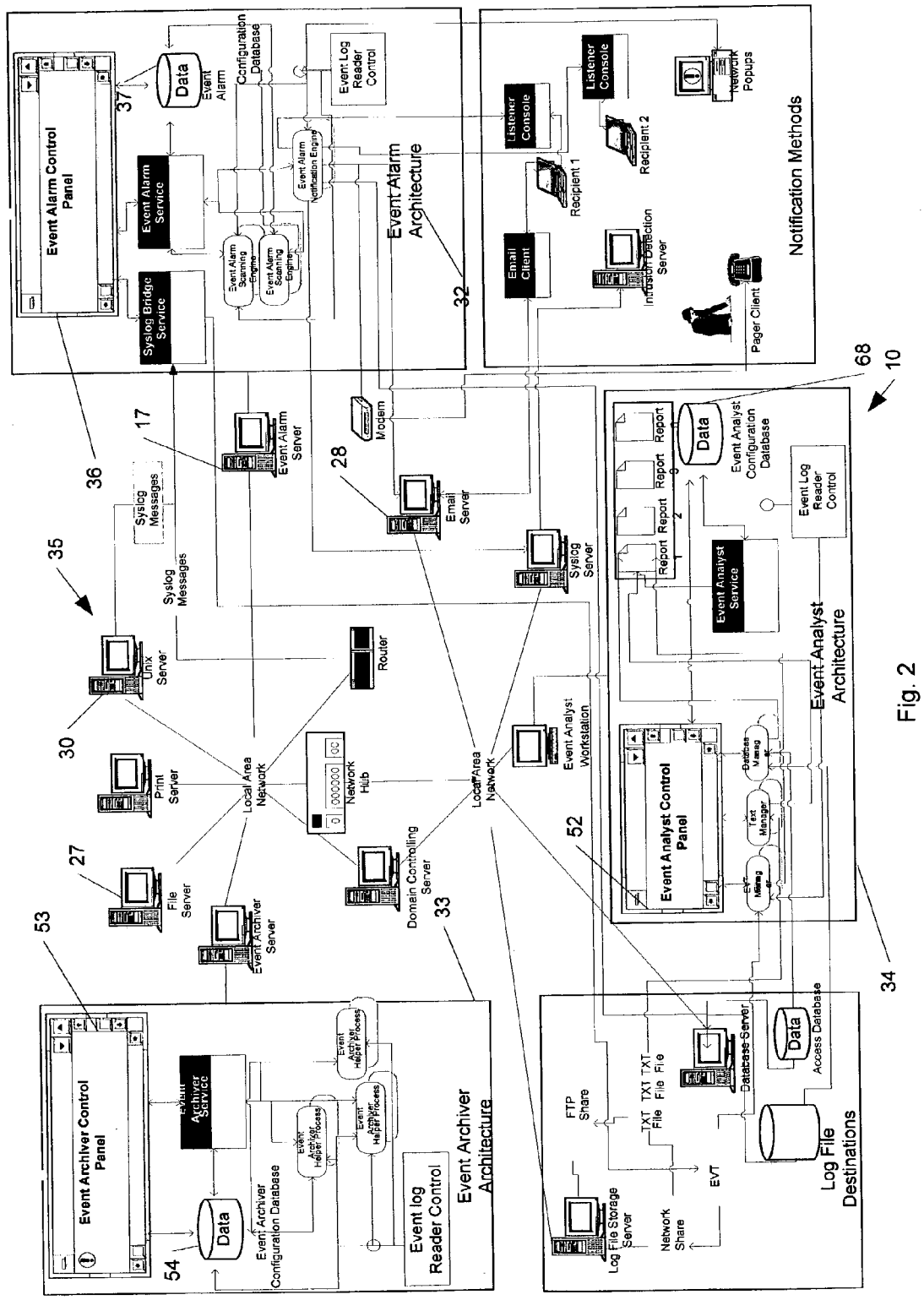
FIG. 2 illustrates a top-level block diagram view of a computer network incorporating the present invention.

A more detailed discussion of the present invention: The present invention 10, FIG. 2 is an agent-free modular Event Log Management System. The present invention 10 comprises four separate and distinct modules that command and control the event archiving, the event alarm and the event analysis of data residing on computer Servers and/or databases and configuration management within a given computer network 35. The computer network 35 may, if desired, be of any configuration as discussed above. The four modules are Event Alarm Module 32, Event Archiver Module 33, Event Analyst Module 34 and the Site Manager Module 100, FIG. 7a. Any given module may, if desired, operationally function independent of the other three modules or the four modules may be combined and in concert form the agent-free modular Event Log Management System.

Figure 7A:
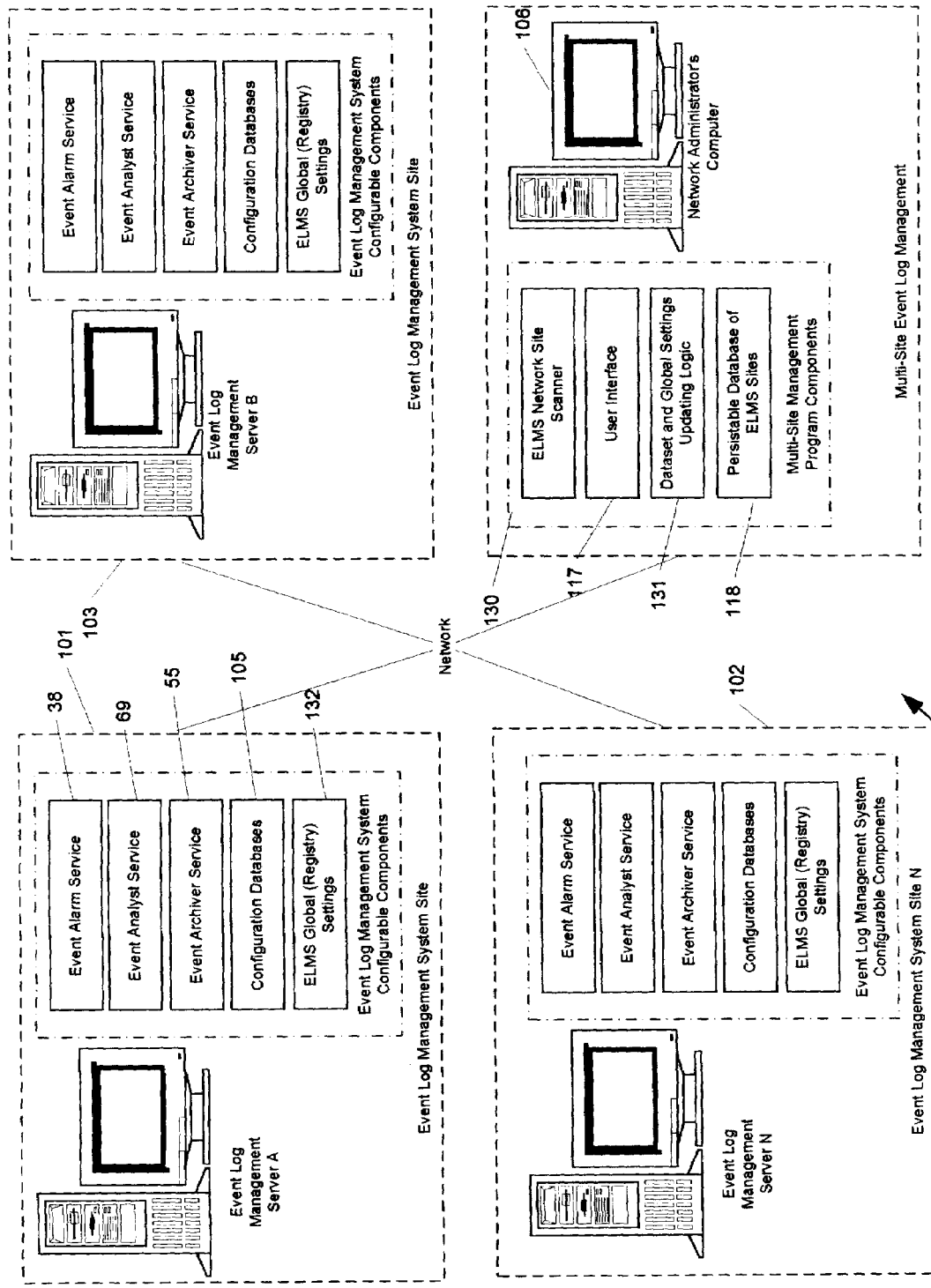
FIG. 7a illustrates a top-level block diagram view of the Site Manager Module.

When deployed together i.e., the Event Alarm Module 32, Event Archiver Module 33, Event Analyst Module 34, FIG. 2 and the Site Manager Module 100, FIG. 7a the system resides on at least one data storage medium of the computer network 35. The System Administrator may, if desired, deploy all four aforementioned modules of the present invention 10 on one data storage medium of the computer network 35 or separately deploy the modules on a plurality of data storage media of the computer network 35 and still maintain system configuration.

Event Alarm Module

The Event Alarm Module 32, FIG. 2 may, if desired, be deployed individually on computer network 35 or in concert with the Event Archiver Module 33, Event Analyst Module 34 and the Site Manager Module 100, FIG. 7a. In any configuration, the functionality of the Event Alarm Module 32 remains the same. The Event Alarm Module 32 operationally functions as a service provider automatically and continuously scanning Server and workstation event logs and notifying System Administrators in real time when new events meet selected criteria. The Event Alarm Module 32 may, if desired, scan the event logs on multiple remote computers without requiring the presence of an agent on individual computers. For example, the Event Alarm Module 32 is deployed on Event Alarm Server 17 and is configured via the System Administrator to "watch over" all of the computers in the computer network 35 and report when new events meet selected criteria established by the System Administrator.

In operation Event Alarm Module 32, FIG. 2 has an Event Alarm Control Panel 36 that enables the System Administrator to configure the command and control of event logs across the computer network domain. The Event Alarm Control Panel 36 may, if desired, be activated in concert with other control Panels associated with other modules of the present invention 10. The configuration of the Event Alarm Module 32 comprises establishing, via an on-screen wizard, event scanning and monitoring, notification methods, data consolidation and review, predefined alarms, audit policy unification, log setting unification and performance alert detection. After the configuration is established, the data is stored on the event alarm configuration database 37.

The event scanning and monitoring configuration defines the different sets of alarms i.e., event criteria and notification recipients for each event log on each computer in the network. Examples of event logs are Application Security, System logs, Active Directory, DNS system and file synchronization on the computer network. Alarms may, if desired, be tripped every time they occur, or they can have a frequency threshold defined to prevent false alarms. After an event log is added to the event Alarm Control Panel 36, FIG. 2 an Event Alarm Service 38, FIG. 3 begins polling computers in the network in a round-robin fashion via an Event Log Reader Control 47 (discussed herein) and an Event Logging Service 39. The Event Logging Service 39 is deployed by the local or network operating system and not the present invention 10. As new entries are detected, Event Alarm Service 38 compares these new entries with alarm criteria. If there is a match 58, notifications 40 are generated. For maximum flexibility, the System Administrator may, if desired, adjust the scanning interval and the number of dedicated scanning processes to best balance resource usage with timely alert generation.

Figure 3:
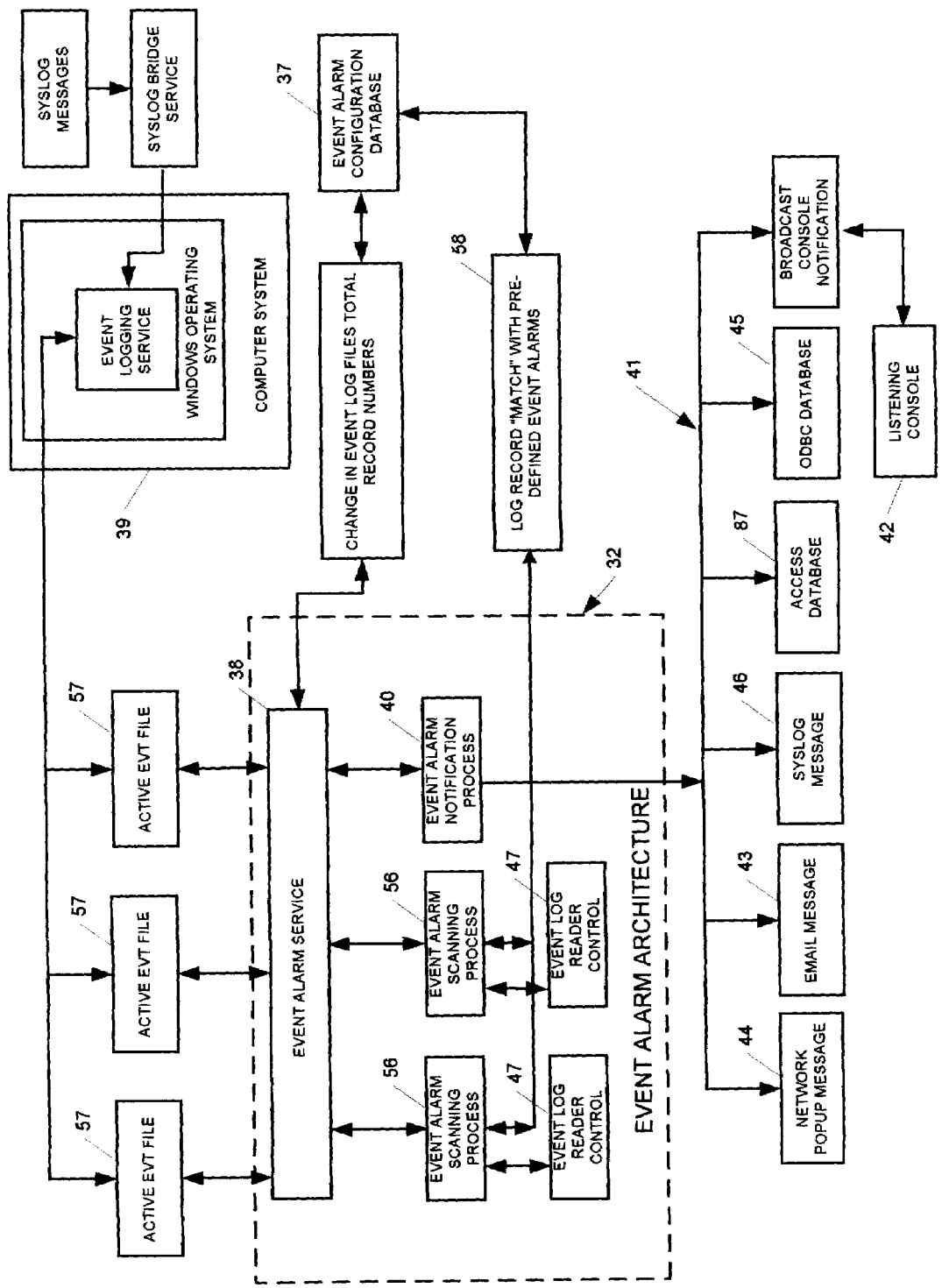
FIG. 3 illustrates a top-level block diagram view of the Event Alarm Architecture of FIG. 2.

The Event Alarm Module 32, FIG. 3 has a plurality of configurable notification methods 41 that may, if desired, be enabled by the System Administrator. When an alarm is tripped, an event log notification is sent to the cognizant party i.e., the System Administrator or his designee via an Email message 43 that may be relayed via an accessible SMTP Server to any central computer network center. Computer network popups 44 may be sent to individual user accounts or computer names in the network domain. Syslog messages 46 may, if desired, be constructed and forwarded to a central syslog server on any central computer network center. A data modem may, if desired, be installed on the computer where Event Alarm Module 32 is deployed, allowing the Event Alarm Module 32 to send numeric messages to a pager assigned to a network administrator. Further, an Event Alarm Listener Console 42 may, if desired, be deployed on the computer network 35 to receive all domain broadcast notifications that the Event Alarm Service 38 sends out when an alarm has been tripped.

The data consolidation and review configuration defines the end storage depository for the event alarm notification data. The data may, if desired, be stored on selected Servers within the computer network, Access Database table 87, FIG. 3 or ODBC Database table 45 for periodic review.

The predefined alarm configuration defines alarms that trigger notification of event logs of interest. Alarms can be defined as inclusive or exclusive, meaning notifications can be triggered if certain criteria are detected, or if the absence of certain criteria is detected. The Event Alarm Module 32, FIG. 3 has a plurality of alarms stored on its configuration database 37 that may, be selected by the System Administrator. The System Administrator may, if desired, create new alarms and store them on the configuration database 37. Examples of predefined alarms are Logon Failure—Bad Username or Password, User Account Disabled, Global Group Membership Change—Member Added, Low Disk Space, All FTP Errors, Device Failure, Document Printed, Active Directory Service Started, All DNS Server Errors and All Distributed File System Errors, etc.

The audit policy unification configuration enables the System Administrator via an audit policy unification wizard that is displayable on the Event Alarm Control Panel 36, FIG. 2 to centralize audit policies on all of the Servers and workstations present in the computer network domain. Walking step-by-step through the wizard, the System Administrator chooses the computers he wishes to "push" the audit policies to create their uniform audit policy and then initiate deployment.

The log setting unification configuration enables the System Administrator, via a log settings unification wizard that is displayable on the Event Alarm Control Panel 36, FIG. 2, to push-deploy a common event log file size and retention strategy to the Servers and workstations in their domain(s).

The performance alert detection configuration establishes notification when a performance alert counter is tripped. The System Administrator configures a predefined alert and adds an event log entry in its Application log then configures Event Alarm Module 32 to monitor for performance alerts on that particular Application log.

A typical operational scenario for the Event Alarm Module 32, FIG. 3: The Event Alarm Module 32 is deployed individually or in concert with other modules of the present invention 10 on one computer of network 35 by the System Administrator. The System Administrator configures the Event Alarm Module 32 as discussed above. The Event Alarm Module 32 begins operation by activating the Event Alarm Service 38. The Event Alarm Service 38 begins the event alarm scanning process 56 by loading the Event Alarm Scanning Engines and Event Alarm Notification Engine, as well as opening up Inter Process Communication channels with them. The Event Alarm Scanning Engines then load the Event Log Reader Control 47 into their memory spaces per the System Administrator's configuration. The Event Log Reader Control 47 begins, via the Event Logging Service 39, to scan selected event logs as discussed above. Once an event meeting the predefined criteria is found, the Event Log Reader Control 47 sends the active event via an Active EVT File 57 to the Event Alarm Service 38 via its Event Alarm Scanning Engine(s). In response to the Active EVT File 57 the Event Alarm Service 38 instructs the Event Alarm Notification Engine to send a notification 40 to cognizant parties via selected notification methods 41. After the scanning process is complete on that particular computer, the Event Log Reader Control 47 begins the same process on the subsequent computers of the network according to the defined configuration. After the process is complete on all of the configured computers of the network, the Event Log Reader Control 47 is unloaded from memory space. The Event Alarm Module 32, Event Alarm Scanning Engines and Event Alarm Notification Engine, as discussed herein, continue this process indefinitely per the System Administrator's configuration or may, if desired, be operated manually from Event Alarm Control Panel 36 at any selected time at the System Administrator's discretion.

Event Log Reader Control

Figure 6:
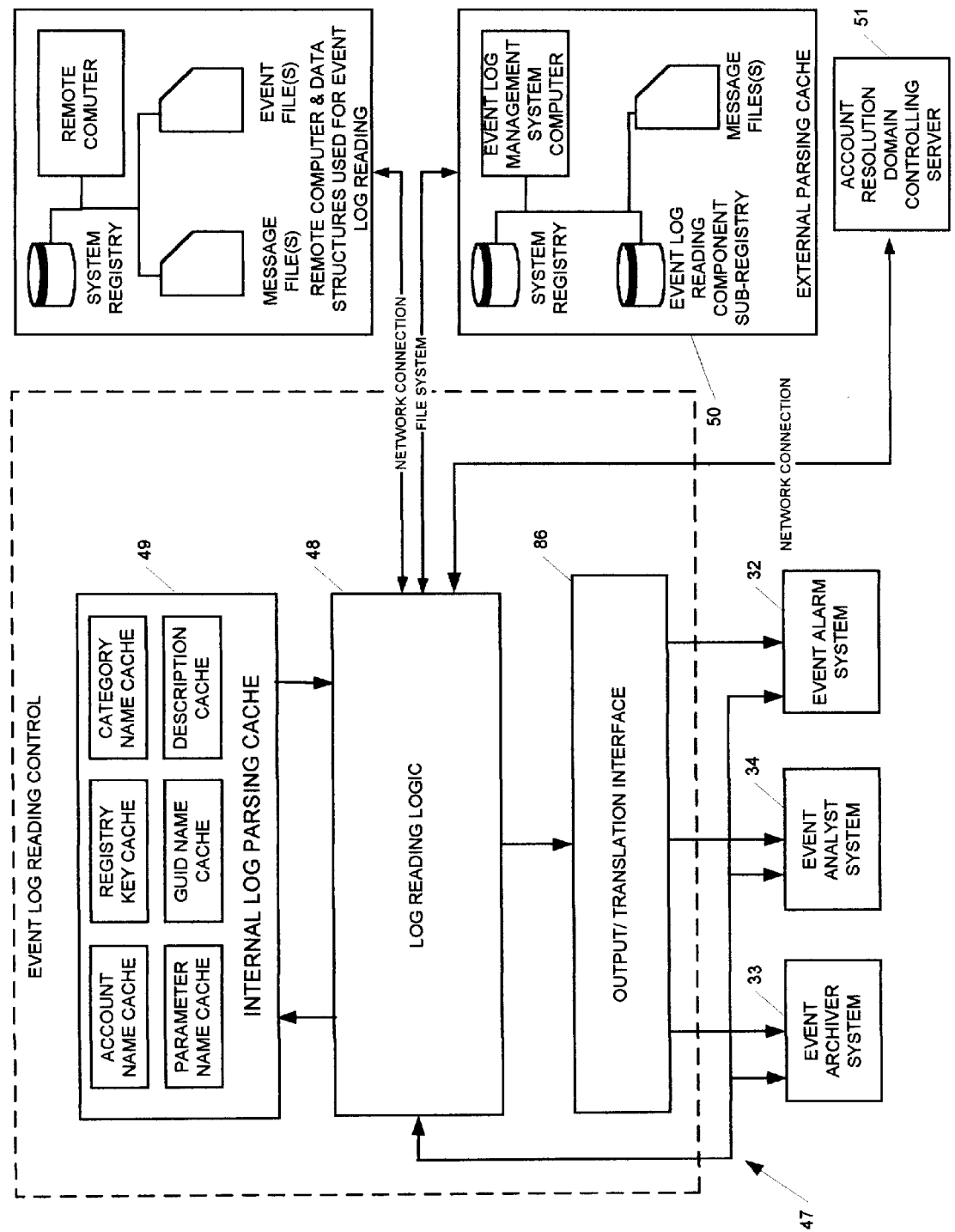
FIG. 6 illustrates a top-level block diagram view of the Event Log Reader Control of FIG. 2.

The Event Log Reader Control 47, FIG. 6 disclosed herein is integrated into the Event Alarm Module 32, Event Archiver Module 33, Event Analyst Module 34 and is a library used by all three principal modules to read and convert event log information located throughout an organization's computer network. The Event Alarm Module 32, Event Archiver Module 33 or Event Analyst Module 34 and their related sub-processes (e.g. the Event Archiver Helper Process, the Event Alarm Scanning Engines, and the Event Alarm Notification Engine, load the Event Log Reader Control 47 into their memory space, and then initiate a request to read a local or network event log through the Log Reader Logic 48 functions. The Log Reader Logic 48 determines whether or not the requested event log is stored locally on the same computer where the Log Reader Logic 48 is operating, or stored on a remote network computer. The Log Reader Logic 48 opens a handle to the event log file either through the local file system or the computer network redirector. The Log Reader Logic 48 begins to assemble the total event log record by locating required message files to complete the assembly. This multi-step process begins by the Log Reader Logic 48 checking the Internal Log Parsing Cache 49, a set of data structures maintained in its own memory (RAM) area, and determines whether it has the necessary account names and/or message file items to parse a complete event log record. If so, it completes all parsing internally without having to traverse the computer network for critical information. Otherwise, it proceeds to seek out account and message file information in other places.

The Internal Log Parsing Cache 49, FIG. 6 continues to grow as long as the Event Log Reader Control 47 remains in memory space for use by the present invention 10. By adaptively storing information needed to parse event log records, it "learns" how to parse common events with each subsequent call to read more log records. As log reading continues over time, the Internal Log Parsing Cache 49 improves the speed and performance of the Event Log Reader Control 47, as unnecessary computer network calls are avoided. Once the Event Log Reader Control 47 is unloaded from memory space, the Internal Log Parsing Cache 49 is destroyed. This is in contrast to the External Event Log Parsing Cache 50 which is stored on a non-volatile storage device. The Log Reader Logic 48 checks the local (non-network) Operating System's registry to see if message files required for this event log are stored locally in the file system. To determine whether this is the case, the Log Reader Logic 48 consults a special sub-section of the registry it maintains (e.g. the Log Reader Logic Sub-Registry). If a matching computer name and log type are found in the registry sub-section, the Log Reader Logic 48 uses this registry information to locate and open handles to message files cached on the local computer. If no matching computer name and log type are found in the Log Reader Logic's 48 registry sub-section, the Log Reader Logic 48 checks to see if the event log being read originates from the same computer operating the present invention 10. If so, the Log Reader Logic uses the local registry to locate and open handles to message files in the local file system. If the event log originates from a remote (non-local) computer, the Log Reader Logic 48 attempts to contact the remote computer over the network. If the remote computer is available, the Log Reader Logic 48 examines the registry of this remote computer to determine the location of particular message files. Once located, the Log Reader Logic 48 opens handles to the message files on the remote system over the computer network. If necessary, the Log Reader Logic 48 also queries either a central Account Resolution Server 51 or the account database on the server where the event log originated. The purpose of querying the database(s) is to resolve security-identifiers (numbers) to textual account names. If the computer where the event log originated is unavailable, and there are no matching message files in the External Log Parsing Cache 50, the Log Reader Logic 48 notes this failure and constructs a limited, incomplete event log record. Similarly, if a security identifier must be translated against a central Account Resolution Server 51, and the Server is unavailable, an incomplete event log record will be returned. Once all relevant information for a given event log record is extracted from message files and Account Resolution Server(s), the Log Reader Logic 48 stores this information in the Internal Log Parsing Cache 49. Any additional requests from the present invention 10 for events with similar message files and/or security identifiers will prompt the Log Reader Logic 48 to consult the Internal Log Parsing Cache 49 in an effort to avoid unnecessary network calls. After obtaining necessary information out of all relevant message files, Account Resolution Servers 51 and/or internal/external cache structures, the Log Reader Logic 48 produces the complete log record from the following items:

The account name, if a security identifier is present

The category name, if a category identifier is present

Parameter name(s), if one or more parameter identifiers are present

GUID (Globally Unique Identifier) names, if one or more GUIDs are present

The description framework, using the event identifier

Once the complete log record is produced, the Log Reader Logic 48 places this record into the Output/Translation Interface 86, where it is retrieved by any subsystem (Event Alarm Module 32, Event Archiver Module 33, Event Analyst Module 34) of the present invention 10. Additional log records may be requested by the present invention 10. If so, the Event Log Reader Control 47 may, if desired, repeat all or part of the acquisition of event logs or message logs.

Once all needed records are retrieved, Event Alarm Module 32, Event Analyst Module 34, or Event Archiver Module 33 instructs the Log Reader Logic 48 to close all event log, registry, and message file handles, and then unload the Event Log Reader Control 47 from memory.

Event Archiver Module

Figure 4:
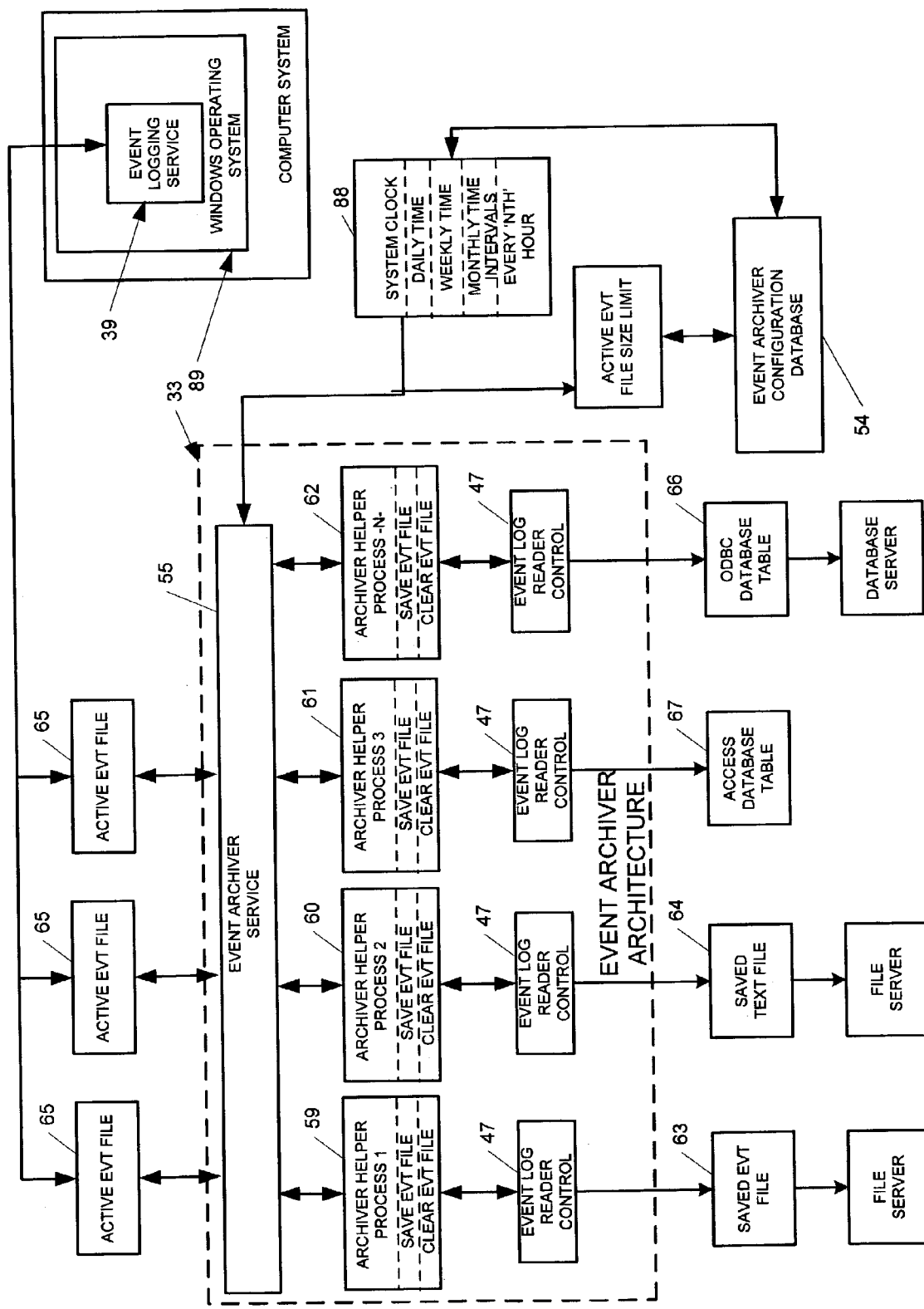
FIG. 4 illustrates a top-level block diagram view of the Event Archiver Architecture of FIG. 2.

The Event Archiver Module 33, FIG. 4 may, if desired, be deployed individually on computer network 35 or in concert with the Event Alarm Module 32, Event Analyst Module 34 and the Site Manager Module 100, FIG. 7*a*. In any configuration, the functionality of the Event Archiver Module 33 remains the same. The Event Archiver Module 33 functions as a service provider that automatically backs up and clears event logs for the System Administrator. The backing up and clearing the event logs for the System Administrator may, if desired, be accessed and controlled via a user Event Archiver Control Panel 53, FIG. 2. The Event Archiver Control Panel 53 has data structures that receive user requested information and transform the information into commands for controlling the Event Archiver Module 33. The Event Archiver Control Panel 53 enables the System Administrator to configure the command and control of archiving event logs across the computer network domain. The Event Archiver Control Panel 53 may, if desired, be activated in concert with other activated Control Panels associated with other modules of the present invention 10. The configuration of the Event Archiver Module 33 comprises establishing, via an on-screen wizard, its ability to backup and clear event logs on remote computers without requiring an agent present on each computer. From one central console on a single workstation, the System Administrator may, if desired, establish archiving strategies for event logs on multiple computers across their domain(s). For example, The System Administrator may, if desired, establish event log archiving, data consolidation, audit policy unification, log setting unification, and archiving on-demand. Furthermore, the System Administrator may manage failed or partially failed archive operations, as well as perform manual, batch importing of EVT files into Access and ODBC database table formats. After the configuration is established, the data is stored on the Event Archiver configuration database 54. The System Administrator may, via the configuration of the Event Archiver Module 33, centralize data in a variety of formats i.e., EVT and comma-delimited text files that may be moved automatically to a central network share, or imported directly into Access and ODBC Databases.

The event log archiving configuration may, if desired, define different archiving schedules for each event log on each computer in the network 35, FIG. 2. Time based scheduling options 88, FIG. 4 include daily, weekly, monthly, and recurring hourly interval settings. Additionally, the System Administrator may, if desired, use an "automatic" scheduling option by electing to have Event Archiver Module 33 save and clear the log when it approaches its file size limit.

The Event Archiver Module 33, FIG. 4 is flexible regarding the data formats it supports. The System Administrator may, if desired, define a multitude of format combinations for any given event log including: EVT Only, Comma-delimited text only, Access only, ODBC only, EVT and Comma-delimited text, EVT and Access or EVT and ODBC. In addition, for flat-file formats such as EVT files and text files, Event Archiver can use third-party compression technology to "zip" these files, ultimately reducing computer network bandwidth during transmission and storage space on file servers.

The System Administrator via the Event Archiver Control Panel's 53, FIG. 2, audit policy unification wizard, centralizes audit policies on all of the Servers and workstations present in the computer network 35. The System Administrator configures the Event Archiver Module 33 by choosing the computers to "push" the audit policies to, create uniform audit policies and then initiate the deployment.

In a similar manner to the audit policy unification wizard, the log settings unification wizard enables the System Administrator via the Event Archiver Control Panel's 53, FIG. 2 to push-deploy a common event log file size and retention strategy to the Servers and workstations in computer network 35.

Once the configuration of the archiving strategy is defined for one or more computers in network 35, the System Administrator via the Event Archiver Control Panel 53 may, if desired, manually initiate event log archiving on individual or all of the computers in network 35. The System Administrator is enabled to immediately begin saving and collecting the data according to the pre-defined configuration.

If partial or complete failures occur during the archiving process, the System Administrator via the Event Archiver Control Panel 53 may, if desired, manage these failed archives by initiating a reattempt of the archiving operation by the Archiver Helper Processes 59, 60, 61, 62 or deleting the failed archives altogether. Partial failures will also be automatically reattempted a finite number of times by the Event Archiver Service 55, adding additional reliability to Event Archiver. Further, the System Administrator via the Event Archiver Control Panel 53 may load the Event Log Reader Control 47 into its memory space and initiate a manual conversion of one or more saved EVT file(s) 63 into an Access Database Table 67 or ODBC Database Table 66.

A typical operational scenario for the Event Archiver Module 33, FIG. 4: The Event Archiver Module 33 is deployed individually or in concert with other modules of the present invention 10 on one computer of network 35 by the System Administrator. The System Administrator configures the Event Archiver Module 33 as discussed above. The Event Archiver Module 33 and or the Operating System 89 begin the operation by activating the Event Archiver Service 55. The Event Archiver Service 55 begins the archiving process by launching the Archiving Helper Process 59, Archiving Helper Process 60, Archiving Helper Process 61 or Archiving Helper Process 62. The Archiving Helper Processes 59 to 62 are configured by the System Administrator according to his archiving strategy. For example, if the System Administrator desires to save event log records in the EVT format 63 the Archiving Helper Process 59 would be configured. If for example the System Administrator desires to save event logs text format 64, Access Database tables 67 format or ODBC 66 format, the Archiving Helper Process 60, Archiving Helper Process 61 or Archiving Helper Process 62 would be configured, respectively.

If the System Administrator wishes to store the event log records in the Saved EVT File format 63, the Archiver Helper Process 59 simply saves the Active EVT File 65 to disk on the originating server, optionally clears records from the Active EVT File 65, and can optionally move the Saved EVT File 63 to a central file server on a file server for long-term storage. If a different output format is desired, Archiver Helper Processes 60, 61, 62 load the Event Log Reader Control 47 into memory space. Controlled by the Archiver Helper Processes 59, 60, 61, 62, the Event Log Reader Control 47 retrieves records from the Saved EVT File 63 on behalf of the Archiver Helper Processes 59, 60, 61, 62. In response to the records retrieved by the Event Log Reader Control 47, the Event Archiver Service 55, via the selected Archiver Helper Process 59 to 62, transforms records from the Saved EVT File 63 in the appropriate format to its associated file Server or Database. After this process is complete, the Event Log Reader Control 47 is unloaded from memory. This process continues for all of the configured computers of the network i.e., the Event Log Reader Control 47 is loaded/unloaded from memory every time an Archiver Helper Process 59, 60, 61 or 62 is loaded/unloaded by the Event Archiver service 55.

Event Analyst Module

Figure 5:
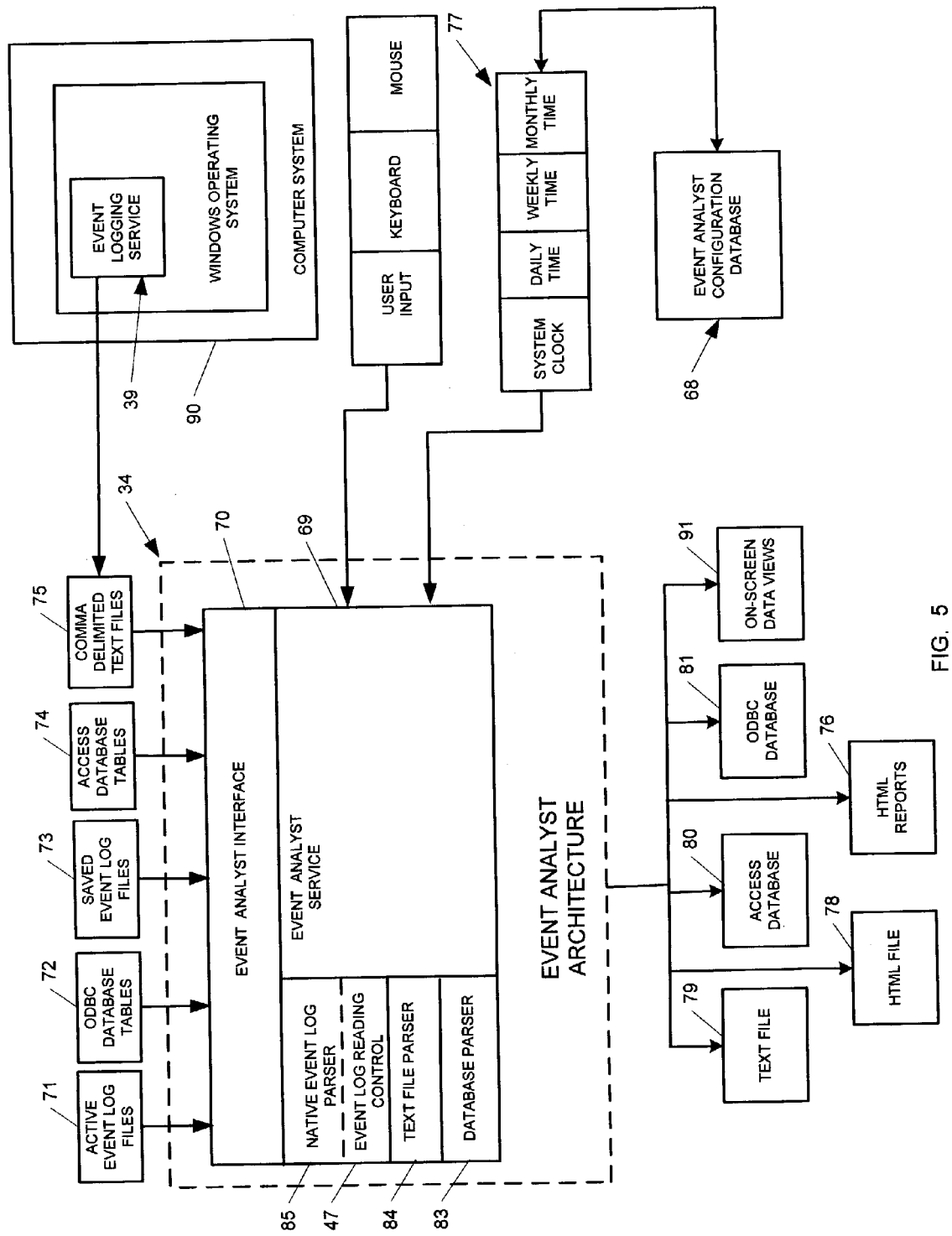
FIG. 5 illustrates a top-level block diagram view of the Event Analyst Architecture of FIG. 2.

The Event Analyst Module 34, FIG. 5 may, if desired, be deployed individually on computer network 35 or in concert with the Event Alarm Module 32, Event Archiver Module 33 and the Site Manager Module 100, FIG. 7*a*. In any configuration, the functionality of the Event Analyst Module 34 remains the same. The Event Analyst Module 34, FIG. 5 analyzes, views and reports on a plurality of event logs. The Event Analyst Module 34 may, if desired, function in the following event log formats: Microsoft® EVT files, Microsoft Event Viewer® formatted comma-delimited text files, Event Archiver/Event Analyst formatted comma-delimited text files, and Event Archiver/Event Analyst compatible database tables created in either Microsoft Access® or other ODBC Databases. Conversely, the Event Analyst Module 34 may, if desired, translate any of the aforementioned formats into Event Archiver/Event Analyst comma-delimited text files, HTML files, or Event Archiver/Event Analyst compatible database tables in Access or ODBC.

The Event Analyst Module 34, FIG. 5 maintains frequently used event log filters and sought-after events inside its own Internal Database 68. When freshly installed, the Event Analyst Module 34 may, if desired, implement a plurality of predefined event log filters, with the majority focusing on common security log audit events. Used in their default configuration, these predefined filters can quickly generate detailed reports on specific types of activity on a computer network. However, The System Administrator may, if desired, customize these filters to further define their scope, such as adding additional user or computer information (e.g. to check and report on user logon and logoff events). Further, the Event Analyst Module 34 may, if desired, store selected events (by Source and EventID) so that the System Administrator may rapidly scroll through a log when searching for certain types of activity.

The Event Analyst Module 34, FIG. 5 may, if desired, be extended through custom-built summary report modules for more generalized or comprehensive reporting. For example, one such module is the Top Ten Most Frequently Occurring Events report, which quickly summarizes these events which occur in the greatest frequency in a given log source. Furthermore, users may use a flexible custom-report generating module to build their own summary reports.

In operation the Event Analyst Module 34, FIG. 5 functions as a service provider that automatically analyzes, views, exports, and reports on event logs for a System Administrator. The analyzing, viewing, exporting, and reporting of event logs for the System Administrator may, if desired, be accessed and controlled via an Event Analyst Control Panel 52, FIG. 2. The Event Analyst Control Panel 52 has data structures to receive System Administrator requested information and transform the information into commands for controlling the Event Analyst Module 34. The Event Analyst Control Panel 52 enables the System Administrator to configure the command and control of analyzing, viewing, exporting and reporting event logs across the computer network domain. The Event Analyst Control Panel 52 may, if desired, be activated in concert with other activated control Panels associated with other modules of the present invention 10. The configuration of the Event Analyst Module 34 comprises establishing, via an on-screen wizard, its ability to analyze, view and report event logs on remote computers without requiring an agent to be present on each computer. From a central console on a single workstation, a System Administrator may, if desired, establish analyzing, viewing and reporting strategies for event logs on multiple computers of the network 35, FIG. 2.

The System Administrator via the Event Analyst Control Panel 52, FIG. 2 may, if desired, open separate windows simultaneously to view and work with event logs in the following formats: Microsoft® EVT format, Microsoft® comma-delimited format, Event Archiver/Event Analyst comma-delimited format, Event Archiver/Event Analyst database tables stored in Microsoft Access® or Event Archiver/Event Analyst database tables stored in ODBC. After opening a log source in any of the above formats, the Event Analyst can export log information to Event Archiver/Event Analyst comma-delimited format, HTML records, Event Archiver/Event Analyst database tables stored in Microsoft Access® or Event Archiver/Event Analyst database tables stored in ODBC. When viewing any active event log, the Event Analyst Module 34 enables the System Administrator to reconfigure the log's size, retention settings and the audit policy for that computer (or the domain at large). Any active computer log can be saved to EVT format or cleared from within the Event Analyst Module 34.

The Event Analyst Module 34, FIG. 5 has a plurality of predefined filters. Since filters are stored locally in the Event Analyst Module's 34 internal database 68, the System Administrator may, if desired, continue to expand the built-in filters with custom entries, and summon them when necessary. Filters are sorted in a drill-down tree view by operating system, log type and category. Once a filter has been applied to an individual log source, the System Administrator, may, if desired, quickly print out a report from the file menu.

The architecture of Event Analyst Module 34, FIG. 5 provides for expansion summary report modules which are provided by Dorian Software Creations, Inc. These modules concentrate on more comprehensive log trends as opposed to detail reports. For example, one such summary report module is the Top Ten Most Frequently Occurring Events report. This module analyzes a given event log source, and compiles the events that are happening in the greatest frequencies to highlight network/security problems or excessive utilization of resources.

The Event Analyst Module 34, FIG. 5 employs multi-threaded log processing so the System Administrator may perform multiple actions at once. For example, the System Administrator may search through one log while simultaneously filtering another log and exporting a third log. In addition, Event Analyst Module 34 uses a MDI interface so the System Administrator may, if desired, have multiple log sources open and visible at the same time within the application.

The Event Analyst Module 34, FIG. 5 may, if desired, read all of the collection formats (e.g. EVT files, text files, and Access/ODBC database tables) used by Event Archiver Module 33. The Event Analyst Module 34 may view, filter, export and report on the event log information collected automatically by Event Archiver Module 33. Used together, the Event Analyst Module 34 and the Event Archiver Module 33 enable the System Administrator to have long-term storage and historical analysis systems for event log data inside a computer network 35. Used separately, Event Analyst Module 34 may give insight to individual computer log activity, or, if manually exported into a database, log data from several computers over a more limited period of time.

A typical operating scenario for the Event Analyst Module 34, FIG. 5: The Event Analyst Module 34 is deployed individually or in concert with other modules of the present invention 10 on computer network 35 by the System Administrator. The System Administrator configures the Event Analyst Module 34 as discussed above. The Event Analyst Module 34 begins the operation by activating the Native Event Log Parser 85 with Event Log Reader Control 47, the Text File Parser 84 or the Database Parser 83. The Log Parsers 83, 84, 85 via the Event Analyst Interface 70 open one or more windows containing data derived from Active Event Log Files 71, ODBC Database Tables 72, Saved Event Log Files 73, Comma Delimited Text Files 75 or Access Database Tables 74. The System Administrator may, if desired, view 91 or report 76, on the log data and have the findings displayed in one or more open windows. Further, the System Administrator may export the results in a text file 79, HTML file 78, in an Access Database 80 table or ODBC Database 81 table.

The Event Analyst Service 69, FIG. 5 may, under System Administrator direction or from the predefined configuration, select a time 77 to connect to log sources 71, 72, 73, 74, 75 present locally 90 or on the computer network 35 for reporting. This process begins by loading the appropriate Summary-Reporting Module into memory space. The Summary Report Module then loads the appropriate Log Parser 83, 84, 85 into memory space. If the event log record source is an Active Event Log File 71 or a Saved Event Log File 73, the Native Event Log Parser 85 is used and it loads the Event Log Reader Control 47 into its memory space. The Event Log Reader Control 47, as discussed herein, retrieves the selected event log records from an Active Event Log File 71 via the Event Logging Service 39, or directly from a Saved Event Log File 73. Once the Event Log Reader Control 47 parses individual log records from an Active Event Log File 71 or Saved Event Log File 73, these records are constructed by the Native Event Log Parser 85 into a HTML File 78 or HTML Report 76 for viewing and reporting. If the event log record source is a comma-delimited text file 75, ODBC Database Tables 72, or Access Database Tables 74, the Text File Parser 84 and/or Database Parser 83 constructs records from each respective format into an HTML file 78 or HTML Report 76. This process continues for all of the configured log sources available on the network scheduled for report generation by the Event Analyst Service 69. After the process is complete on all the configured log sources present locally 90 or on the computer network 35, the Event Log Reader Control 47 is unloaded from memory.

Site Manager Module

The System Administrator may, if desired, implement a Site Manager Module 100, FIG. 7a on a central computer 106 in communication with the computer network 35. The Site Manager Module 100 controls the updating of the Event Analyst Module 34, Event Alarm Module 32 and the Event Archiver Module 33 that may be installed on selected computers throughout the computer network 35. The System Administrator may, if desired, add selected computers or other networks to the control structure of the Site Manager Module 100. The Event Analyst Module 34, Event Alarm Module 32 and the Event Archiver Module 33 may, if desired, be installed separately on individual computers or unloaded from selected computers and reloaded to any computer in the network 35. The Site Manager Module 100 scans the computer network to determine the location of each Event Analyst Module 34, Event Alarm Module 32 and the Event Archiver Module 33 deployed on computer throughout the computer network 35. Further, once the scan, is complete the Site Manager Module 100 constructs a network schema that is viewable by the System Administrator. After the locations of the Event Analyst Module 34, Event Alarm Module 32 and the Event Archiver Module 33 are identified, the Site Manager Module 100 may, if desired, push new or updated configuration datasets to selected sites. For example, the Site Manager Module 100 is installed on the System Administrator's computer 106 and is in communication with an event log management site 101. The Site Manager Module 100 locates the individual system modules that are deployed throughout the event log management site 101. The Site Manager Module 100, via the Event Alarm Service 38, Event Analyst Service 70, Event Archiver Service 55 and their associated Configuration databases 105, pushes new or updated configuration datasets to the respective Event Analyst Module 34, Event Alarm Module 32 and Event Archiver Module 33. The System Administrator may, if desired, add event log management sites 103 through event log management site -N- (FIG. 7a, 102) to the Site Manager Module's 100 scan to locate additional Event Analyst Modules 34, Event Alarm Modules 32 and Event Archiver Modules 33.

Figure 7B:
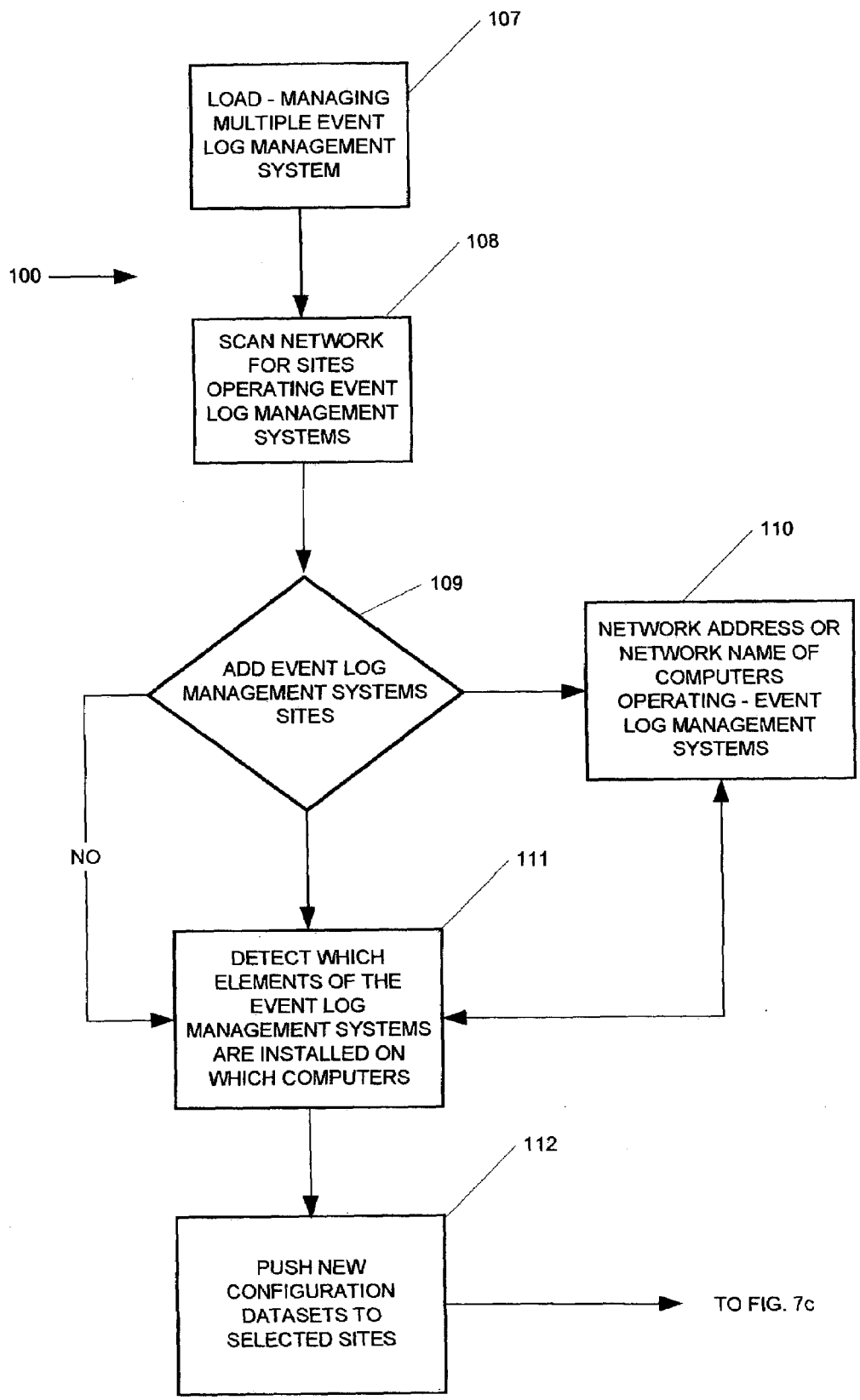
FIG. 7b illustrates a flow diagram view of the Site Manager Module of FIG. 7a, FIG. 7c illustrates a flow diagram view of pushing dataset configurations of FIG. 7b.

The Site Manager Module's 100 FIG. 7b, operational function begins with the loading 107 of the Site Manager Module 100 onto the System Administrator's computer 106, FIG. 7a. The Site Manager Module 100 begins to scan 108 the computer network 35 for the Event Analyst Module 34, Event Alarm Module 32 and the Event Archiver Module 33. The System Administrator may, if desired, add an event log management site 109 via a network address or network name 110 to the scan 108. The Site Manager Module 100 detects 111 which elements of the present invention 10 are installed on which computers of the computer network 35. The Site Manager Module 100 pushes new configuration datasets to selected sites 112.

Figure 7C:
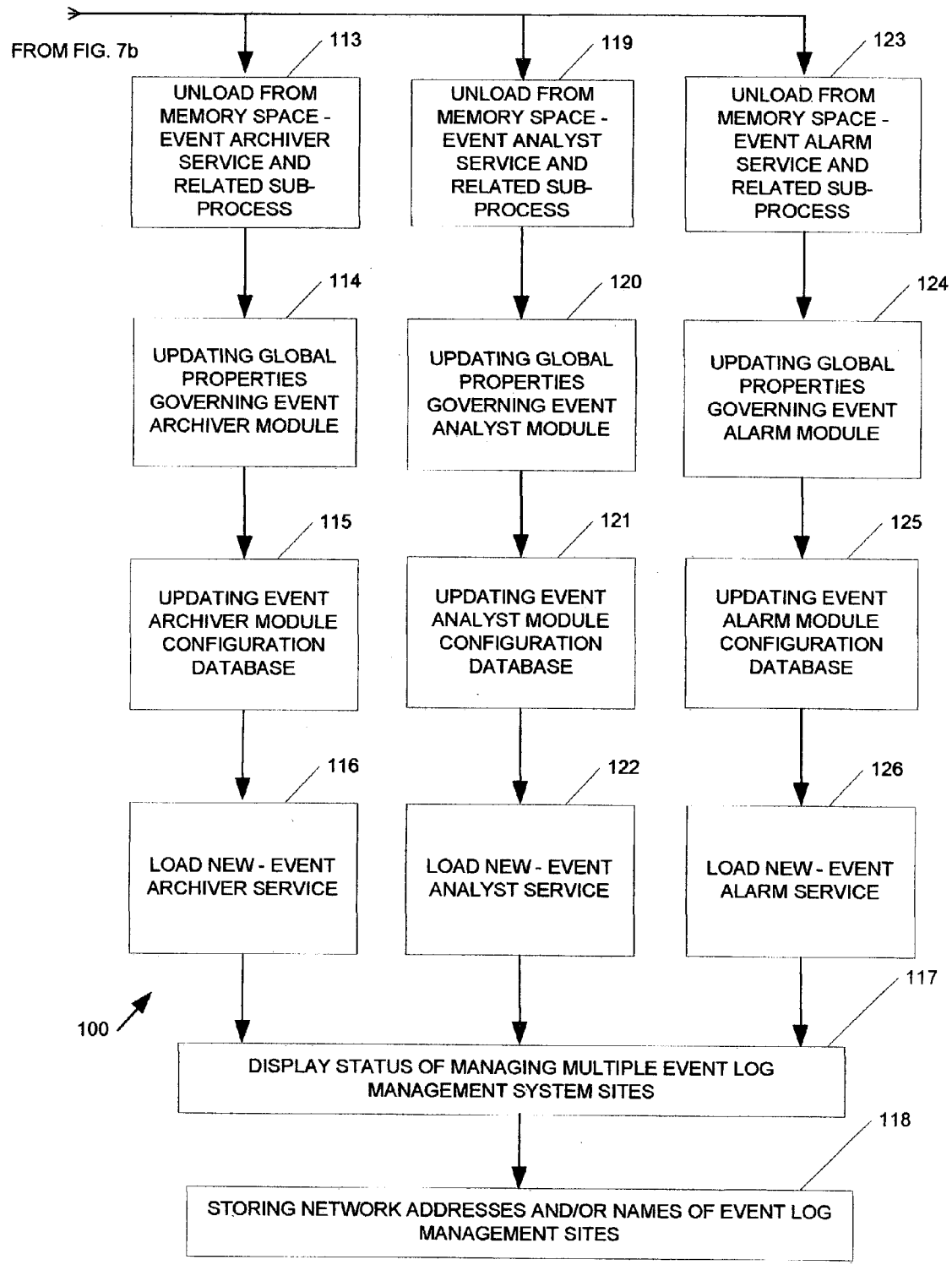

The Site Manager Module 100, FIG. 7c has a plurality of programs that command and control the following process of pushing updated configuration datasets to selected sites:

Stopping (unloading from memory space) the Event Archiver Service 113 and all related sub-processes on the computer maintaining the site.

Stopping (unloading from memory space) the Event Analyst Service 119 and all related sub-processes on the computer maintaining the site.

Stopping (unloading from memory space) the Event Alarm Service 123 and all related sub-processes on the computer maintaining the site.

Updating global properties governing the Event Archiver Module 114 in the remote system registry 132.

Updating global properties governing the Event Analyst Module 120 in the remote system registry 132.

Updating global properties governing the Event Alarm Module 124 in the remote system registry 132.

Updating the Event Archiver Module's configuration database 115 on the remote system's mass storage device 54, FIG. 2.

Updating the Event Analyst Module's configuration database 121 on the remote system's mass storage device 68, FIG. 2.

Updating the Event Alarm Module's configuration database 125 on the remote system mass storage device 37, FIG. 2.

Starting (loading into memory space) the new Event Archiver Service 116 and all related sub-processes on the computer maintaining the site.

Starting (loading into memory space) the new Event Analyst Service 122 and all related sub-processes on the computer maintaining the site.

Starting (loading into memory space) the new Event Alarm Service 126 and all related sub-processes on the computer maintaining the site.

The System Administrator may, if desired, display the status of the Site Manager Module 100 via a user interface 117 i.e., completion of the configuration update of the Event Analyst Module 34, Event Alarm Module 32 and the Event Archiver Module 33. The System Administrator may, if desired, forgo displaying the status of individual configuration updates until all the selected Modules of the computer network have been updated. Further, the System administrator may, if desired, store 118 the network addresses and/or names of the sites containing the Event Analyst Module 34, Event Alarm Module 32 and the Event Archiver Module 33 for use in future configuration updates.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. An agent-free system for event log management residing on at least one computer, the computer being integral to a computer network wherein at least one computer of the computer network is generating event logs, at least one database in communication with the computer network, the agent-free system having a plurality of data structures formulated into at least one instruction module to direct the event log management of the event logs across a domain of the computer network, comprising:

a) an Event Alarm Module operationally retrieving at least one event log record from a selected computer within the computer network;

b) said Event Alarm Module selectively notifying a selected recipient of said retrieved event log record;

c) said Event Alarm Module storing said retrieved event log record on the database;

d) an Event Archiver Module operationally retrieving at least one event log record from a selected computer within the computer network;

e) said Event Archiver Module selectively storing said retrieved event log record on the database;

f) an Event Analyst Module opening at least one window containing event log records selected from a group consisting of Event Alarm Module's stored event log records and Event Archiver Module's stored event log records; and g) said Event Alarm Module operationally retrieving at least one event log record is defined as said Event Alarm Module loading an Event Log Reader Control onto its memory space, said Event Log Reader Control searches the network according to a predefined criteria for at least one event log record, once obtained said Event Log Reader Control returns the event log to said Event Alarm Module, subsequently said Event Alarm Module unloads said Event Log Reader Control from its memory space.

2. An agent-free system as recited in claim 1 further comprising:

h) said Event Analyst Module operationally retrieving at least one event log record;

i) said Event Analyst Module selectively parsing said retrieved event log record;

j) said Event Analyst Module opening a second window containing said selectively parsed event log records; and k) said Event Analyst Module storing on the database said selectively parsed event log records.

3. An agent-free system as recited in claim 1 further comprising:
   l) said Event Analyst Module operationally retrieving at least one event log record;
   m) said Event Analyst Module selectively parsing said retrieved event log record;
   n) said Event Analyst Module opening a second window containing said selectively parsed event log records; and
   o) said Event Analyst Module clearing said selectively parsed event log records from the originating computer.

4. An agent-free system as recited in claim 1 wherein said selected computer is the same computer hosting said Event Alarm Module.

5. An agent-free system as recited in claim 1 wherein said selected computer is a computer other than the computer hosting said Event Alarm Module.

6. An agent-free system as recited in claim 1 wherein said selectively notifying is selected from a group consisting of network popup message, email, Syslog message, pager, SNMP trap, custom executable action, and a listening console.

7. An agent-free system as recited in claim 1 wherein said selected recipient is selected from a group-consisting of a System Administrator, a computer, an Access database and an ODBC database.

8. An agent-free system as recited in claim 1 wherein said Event Archiver Module operationally retrieving at least one event log record is defined as said Event Archiver Module saving an event log file to disk, loading an Event Log Reader Control onto its memory space, retrieving at least one event log record, once obtained said Event Log Reader Control returns the event log file and/or event log records to said Event Archiver Module, optionally removing the original saved event log from disk, subsequently said Event Archiver Module unloads said Event Log Reader Control from its memory space.

9. An agent-free system as recited in claim 1 wherein said Event Archiver Module selectively storing said retrieved event log record is defined as storing format being selected from a group consisting of EVT file, compressed EVT File, comma-delimited text file, compressed text file, Access database table and ODBC database table.

10. An agent-free system as recited in claim 2 wherein said Event Analyst Module operationally retrieving at least one event log record is defined as said Event Analyst Module selectively loading an Event Log Reader Control onto its memory space, said Event Log Reader Control searches the network according to a predefined criteria for at least one event log record, once obtained said Event Log Reader Control returns the event log to said Event Analyst Module, subsequently said Event Analyst Module unloads said Event Log Reader Control from its memory space.

11. An agent-free system as recited in claim 3 wherein said Event Analyst Module operationally retrieving at least one event log record is defined as said Event Analyst Module selectively loading an Event Log Reader Control onto its memory space, said Event Log Reader Control searches the network according to a predefined criteria for at least one event log record, once obtained said Event Log Reader Control returns the event log to said Event Analyst Module, subsequently said Event Analyst Module unloads said Event Log Reader Control from its memory space.

12. An agent-free system as recited in claim 2 wherein said stored event log records are selected from a group consisting of event log records for viewing, event log records for filtering, event log records for exporting and event log records for reporting.

13. An agent-free system for event log management residing on at least one computer, the computer being integral to a computer network, wherein at least one computer of the computer network is generating event logs, at least one database in communication with the computer network, the agent-free system having a plurality of data structures formulated into at least one instruction module to direct the event log management of the event logs across a domain of the computer network, comprising:
   a) an Event Alarm Module in communication with the computer network;
   b) said Event Alarm Module loading an Event Log Reader Control into its memory space;
   c) said Event Log Reader Control retrieving selected event log records from at least one computer of the network;
   d) said Event Alarm Module evaluating said retrieved event log records according to a selected alarm criteria;
   e) said Event Alarm Module selectively generating an event alarm based on said evaluation;
   f) an Event Alarm Module selectively notifying the computer network of said event alarm;
   g) said Event Alarm Module unloading said Event Log Reader Control from its memory space; and
   h) said Event Alarm Module operationally retrieving at least one event log record is defined as said Event Alarm Module loading an Event Log Reader Control onto its memory space, said Event Log Reader Control searches the network according to a predefined criteria for at least one event log record, once obtained said Event Log Reader Control returns the event log to said Event Alarm Module, subsequently said Event Alarm Module unloads said Event Log Reader Control from its memory space.

14. An agent-free system as recited in claim 13 wherein said selectively generated event alarm is determined by a predefined alarm configuration.

15. An agent-free system as recited in claim 13 further comprising: an Event Alarm Module selectively notifying the network of said event alarm.

16. An agent-free system as recited in claim 13 further comprising: said Event Alarm Module selectively polling the computer network domain for selected event logs.

17. An agent-free system as recited in claim 13 further comprising:
   a) an Event Alarm Service in communication with said Event Alarm Module;
   b) an Event Alarm Control Panel in communication with said Event Alarm Service;
   c) said Event Alarm Control Panel receiving requests for operational direction governing event log management; and
   d) said Event Alarm Service translating said requests into commands for controlling said Event Alarm Module.

18. An agent-free system as recited in claim 13 wherein said Event Log Reader Control comprises:
   a) a plurality of data structures formulated into Event Log Reader Logic, said Event Log Reader Logic receiving a request to read a selected event log;
   b) said Event Log Reader Logic determining the location of said selected event log;
   c) said Event Log Reader Logic opening a handle to an event log file containing said selected event log;

d) said Event Log Reader Logic receiving the location from said Event Alarm Module of said selected event log within said event log file;
e) said Event Log Reader Logic assembling an event log record of said selected event log;
f) said Event Log Reader Logic transmitting said event log record to said Event Alarm Module; and
g) said Event Log Reader Logic receiving a command from said Event Alarm Module to close event logs, registry, and message file handles and unloads said Event Log Reader Control from the memory of said selected computer of the computer network.

19. An agent-free system as recited in claim 18 wherein said Event Log Reader Logic assembles said event log record via an Internal Log Parsing Cache.

20. An agent-free system as recited in claim 18 wherein said Event Log Reader Logic assembles said event log record via an External Log Parsing Cache.

21. An agent-free system as recited in claim 18 wherein said event log record content is selected from a group consisting of account name, category name, parameter name, GUID name and description framework.

22. An agent-free system for event log management residing on at least one computer, the computer being integral to a computer network, wherein at least one computer of the computer network is generating event logs, at least one database in communication with the computer network, the agent-free system having a plurality of data structures formulated into at least one instruction module to direct the event log management of the event logs across a domain of the computer network, comprising:
   a) an Event Archiver Module in communication with the computer network;
   b) said Event Archiver Module loading an Event Log Reader Control into its memory space;
   c) said Event Log Reader Control retrieving selected event log records from at least one said computer;
   d) said Event Archiver Module selectively storing said retrieved event log records;
   e) said Event Archiver Module selectively clearing said stored event log records from the originating said computer; and
   f) said Event Archiver Module unloading said Event Log Reader Control from said selected computer; and
   g) said Event Alarm Module operationally retrieving at least one event log record is defined as said Event Alarm Module loading an Event Log Reader Control onto its memory space, said Event Log Reader Control searches the network according to a predefined criteria for at least one event log record, once obtained said Event Log Reader Control returns the event log to said Event Alarm Module, subsequently said Event Alarm Module unloads said Event Log Reader Control from its memory space.

23. An agent-free system as recited in claim 22 further comprising:
   h) an Audit Policy push-deployed to selected computers across the domain of the computer network;
   i) said Audit Policy creating a uniform event log size for selected computers across the domain of the computer network; and
   j) said Audit Policy creating uniform retention of event logs for computers across the domain of the computer network.

24. An agent-free system as recited in claim 22 wherein said selectively clearing said stored event log records being driven by time based scheduling.

25. An agent-free system as recited in claim 22 wherein said selectively storing said retrieved event log records being retrievable in a format selected from a group consisting of .EVT, ODBC, comma-delimited, Access, .EVT and comma delimited, EVT and Access, .EVT and ODBC.

26. An agent-free system for event log management residing on at least one computer, the computer being integral to a computer network, wherein at least one computer of the computer network is generating event logs, at least one database in communication with the computer network, the agent-free system having a plurality of data structures formulated into at least one instruction module to direct the event log management of the event logs across a domain of the computer network, comprising:
   a) an Event Analyst Module in communication with the computer network;
   b) said Event Analyst Module loading an Event Log Reader Control into its memory space;
   c) said Event Log Reader Control retrieving selected event log records from at least one computer of the computer network;
   d) said Event Analyst Module selectively filtering said retrieved event log records;
   e) said Event Analyst Module selectively generating at least one window containing said filtered event log records;
   f) an Event Analyst Module formulating at least one report derived from said window containing said filtered event log records; and
   g) said Event Analyst Module unloading said Event Log Reader Control from its memory space; and
   h) said Event Alarm Module operationally retrieving at least one event log record is defined as said Event Alarm Module loading an Event Log Reader Control onto its memory space, said Event Log Reader Control searches the network according to a predefined criteria for at least one event log record, once obtained said Event Log Reader Control returns the event log to said Event Alarm Module, subsequently said Event Alarm Module unloads said Event Log Reader Control from its memory space.

27. An agent-free system as recited in claim 26 further comprising a predefined filter operationally disposed to said Event Analyst Module for retrieving selected event log records.

28. An agent-free system as recited in claim 26 wherein said window containing said filtered event log records being displayable in a format selected from a group consisting of .EVT, comma-delimited, Access and ODBC.

29. An agent-free system as recited in claim 26 further comprising:
   i) an Events Database in communication with said Event Analyst Module;
   k) said Events Database having stored therein selectively filtered event log records;
   k) said selectively filtered event log records representing selected event activity;
   l) said selected event activity derived from recurring events;
   m) said recurring events being stored according to the source of the event; and
   n) said recurring events being stored according to an EventID.

30. An agent-free system as recited in claim 1 further comprising:
  i) a Site Manager Module selectively locating said Event Alarm Module, said Event Archiver Module and said Event Analyst Module on the computer network; and
  j) said Site Manager Module pushing selected dataset configuration to selected located computers having said Event Alarm Module, said Event Archiver Module or said Event Analyst Module disposed thereon.

31. An agent-free system as recited in claim 30 wherein said Site Manager Module selectively locating said Event Alarm Module, said Event Archiver Module and said Event Analyst Module on the computer network comprises:
  a) said Site Manager Module having a network scanning program to locate which computers of the network have said Event Archiver Module operationally disposed thereon;
  b) said network scanning program locating which computers of the network have said Event Alarm Module operationally disposed thereon;
  c) said network scanning program locating which computers of the network have said Event Analyst Module operationally disposed thereon; and
  d) said Site Manager Module having a schema program for constructing a viewable map of the locations of said Event Alarm Module, said Event Archiver Module and said Event Analyst Module on the computer network.

32. An agent-free system as recited in claim 30 wherein said dataset configuration is selected from a group consisting of updating the Event Archiver global properties, updating the Event Archiver Module Configuration database and loading an Event Archiver Service.

33. An agent-free system as recited in claim 30 wherein said dataset configuration is selected from a group consisting of updating Event Alarm global properties, updating Event Alarm Module Configuration database and loading an Event Alarm Service.

34. An agent-free system as recited in claim 30 wherein said dataset configuration is selected from a group consisting of updating Event Analyst global properties, updating the Event Analyst Module Configuration database and loading an Event Analyst Service.

* * * * *